INVENTORS C.G. DAVIS
L.C. THOMAS
BY Leonard M. Arnold
ATTORNEY

Nov. 14, 1967 C. G. DAVIS ET AL 3,353,158

DATA TRANSMISSION

Filed Oct. 8, 1964 12 Sheets-Sheet 2

Nov. 14, 1967 C. G. DAVIS ET AL 3,353,158

DATA TRANSMISSION

Filed Oct. 8, 1964 12 Sheets-Sheet 4

Nov. 14, 1967 C. G. DAVIS ET AL 3,353,158

DATA TRANSMISSION

Filed Oct. 8, 1964 12 Sheets-Sheet 10

United States Patent Office 3,353,158
Patented Nov. 14, 1967

3,353,158
DATA TRANSMISSION
Claude G. Davis, Colts Neck, and Lewis C. Thomas, North Plainfield, N.J., assignors to Bell Telephone Laboratories, Incorporated, New York, N.Y., a corporation of New York
Filed Oct. 8, 1964, Ser. No. 402,505
6 Claims. (Cl. 340—172.5)

Figure 1:
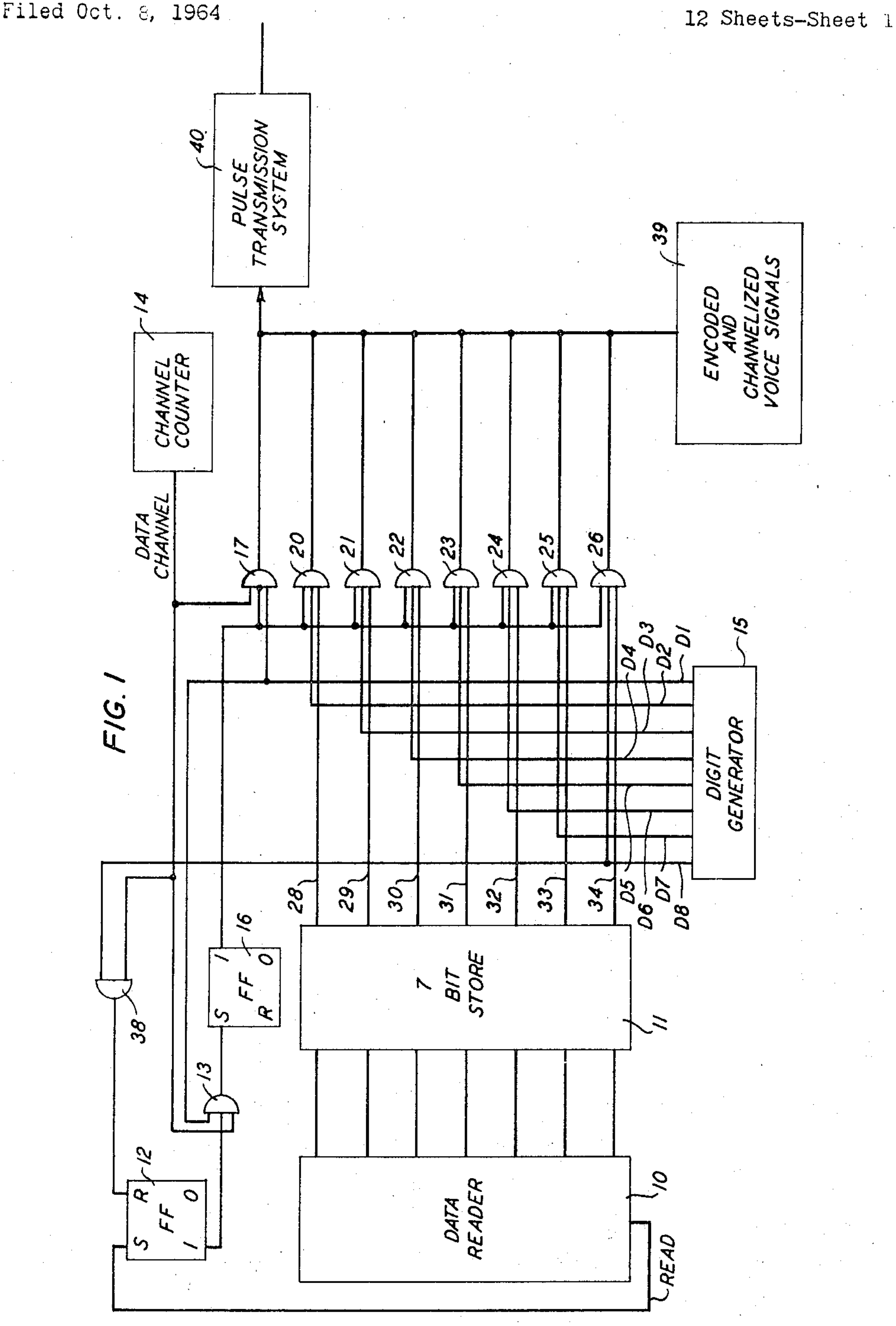
Figure 2:
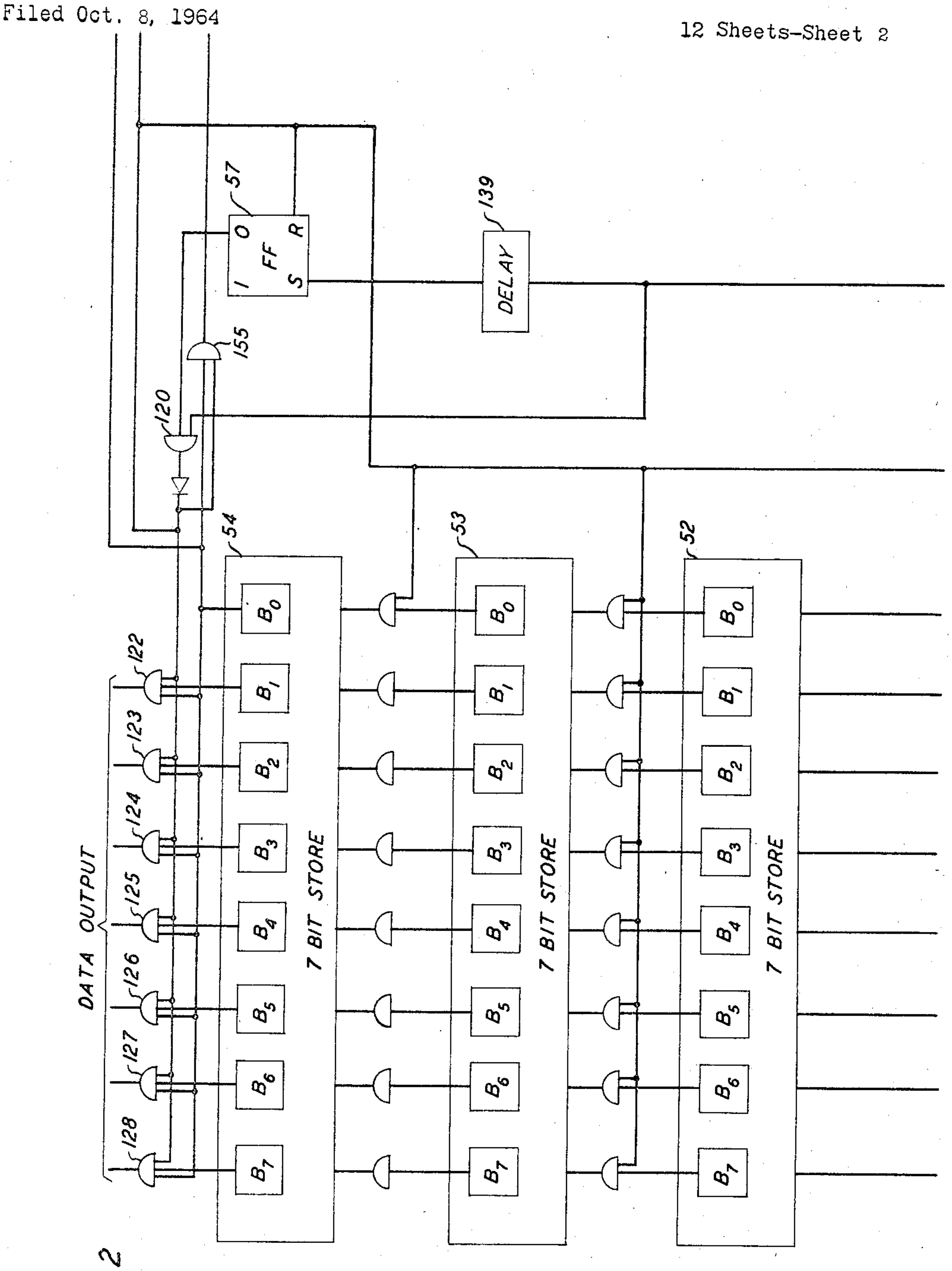
Figure 3:
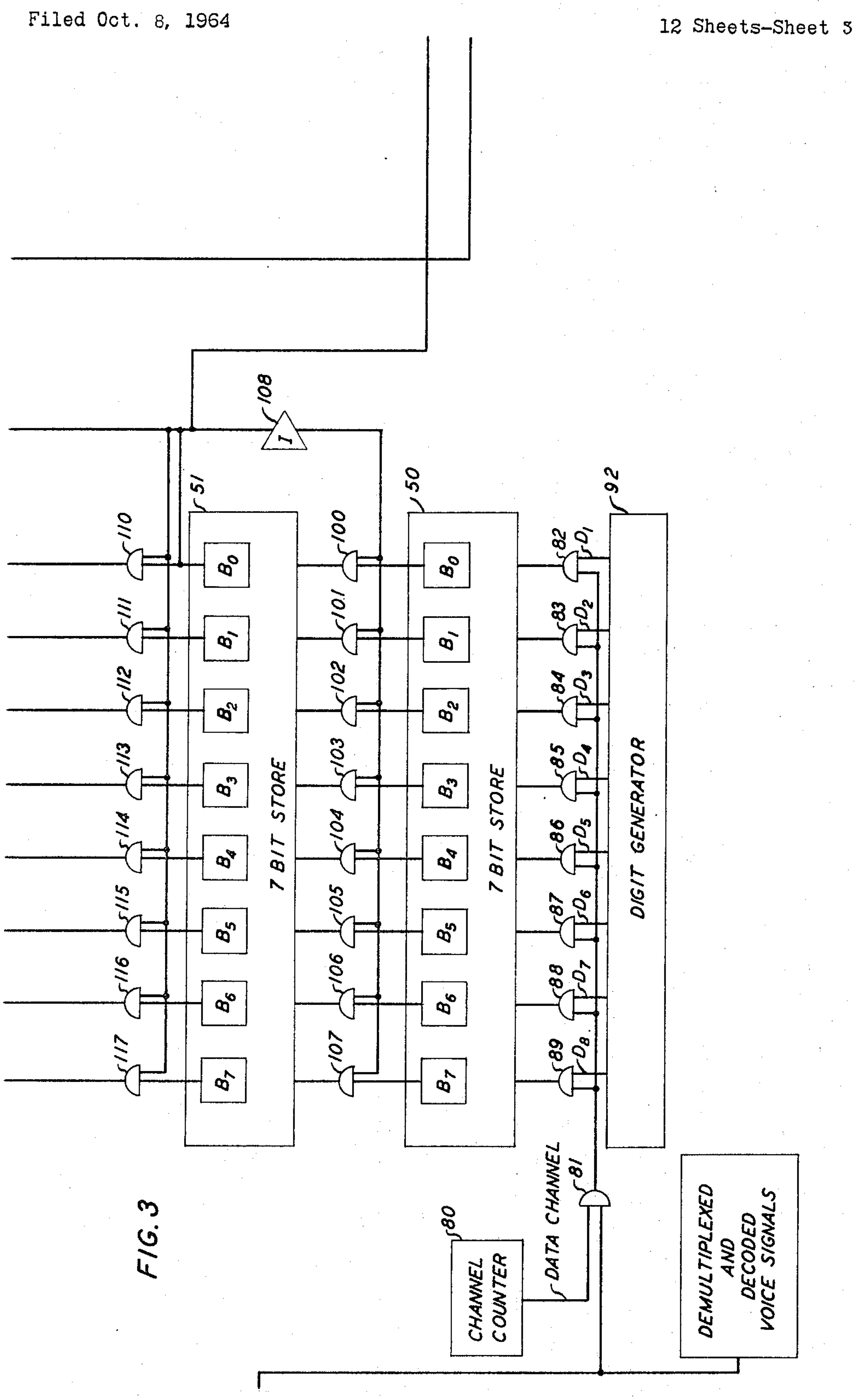

This invention relates to data transmission and particularly to the transmission of nonsynchronous binary data over a selected channel of a synchronous time multiplex pulse transmission system.

The pulse transmission system described in the January 1962 issue of the Bell System Technical Journal by C. G. Davis in "An Experimental Pulse Code Modulation System for Short-Haul Trunks," pages 1–24, and by J. S. Mayo in "A Bipolar Repeater for Pulse Code Modulation Systems," pages 1–27, appears to be ideally suited for transmission of data from one source, such as a data tape, to a distant store or utilization device, since it already transmits information in digital form. Such transmission is not easily accomplished in an economical manner, however, due to the great difference in the information carrying capacity of the transmission system and the speed of the data tape. The pulse transmission system described in the above-mentioned articles in the Bell System Technical Journal provides for the transmission of 24 voice channels. The signals present in each channel are sampled in a recurring sequence, and one sample from each channel, or 24 samples, are encoded and transmitted every 125 microseconds. Each sample is encoded into a digital signal occupying 7 time slots, with an additional time slot allocated for signaling information. Since each encoded sample, including any signaling, occupies 8 time slots, the 24 samples require a total of 192 time slots for the transmission over the system. An additional, or 193rd, time slot is added to permit synchronizing or framing the transmitter and receiver of the system, and these 193 time slots comprise a framing period. There are 8000 such periods or frames each second, and the repetitive rate of pulses on the transmission system is 1.544 million pulses per second. Since one time slot in every channel is usually allocated for signaling, each channel of the pulse transmission system is capable of transmitting 56 kilobits per second, which capacity is generally enough to handle data from a single commercial data tape source.

Typical commercially available data equipment uses a data tape which employs 7 tracks of information so that 7 bits appearing in parallel across the data tape comprise a data character. The speed of the tape is quoted in terms of characters per second, and the maximum speed presently obtainable with commercially available equipment is approximately 62.5 kilocharacters per second. Most commercial data tape machines, however, operate at considerably slower speeds and can be accommodated by the 56 kilobits per second of the single channel of the above-described pulse transmission system.

Thus, it is desired that data from a single data source be transmitted over a single channel of the pulse transmission system with those channels of the system not used for the transmission of data being made available for voice transmission by subscribers or the transmission of data from other sources.

It is an object of this invention, therefore, to transmit binary data from a source such as a data tape to a utilization device over one or more channels of the regenerative pulse transmission system, the remaining channels of the system being employed for the transmission of voice signals from subscribers or data from other sources.

Copending application Serial No. 332,152, filed December 20, 1963, discloses apparatus for transmitting data over one or more channels of the regenerative pulse transmission system and also reproduces at the receiving terminal the instantaneous rate at which data were applied to the transmitting terminal. Frequently, however, such reproduction of the instantaneous data rate is unnecessary since usually no information is transmitted in the spacing of the data characters themselves. Indeed, such faithful reproduction of the data rate may, in fact, be undesirable, as for example where the peak rate of the transmitting equipment exceeds the peak rate of the data handling equipment at the receiving terminal. In such a situation if the average data handling capability of the equipment at the receiving terminal is equal to the average rate at which data are transmitted, it is much more desirable to reproduce the data at the receiving terminal at the average rate at which it was transmitted. Such average data rate reproduction smooths out the data peaks and permits the use of equipment which could otherwise not handle data received at the peak rate of the transmitting equipment.

It is therefore an object of this invention to not only transmit binary data over one or more channels of the regenerative pulse transmission system but to reproduce at the receiver the data at the approximate average data rate at which it was applied to the transmitting terminal.

In accordance with this invention, binary data from a data source such as a data tape is transmitted over a channel of the regenerative pulse transmission system by storing a data character until the occurrence of the channel allocated for the transmission of data, transmitting the data character at the pulse repetition frequency of the transmission system in the data channel, storing the data in a plurality of stores at the receiver, measuring the rate at which data are stored in the stores, and reading out the data at the average rate at which it is stored.

Figures 4, 7:
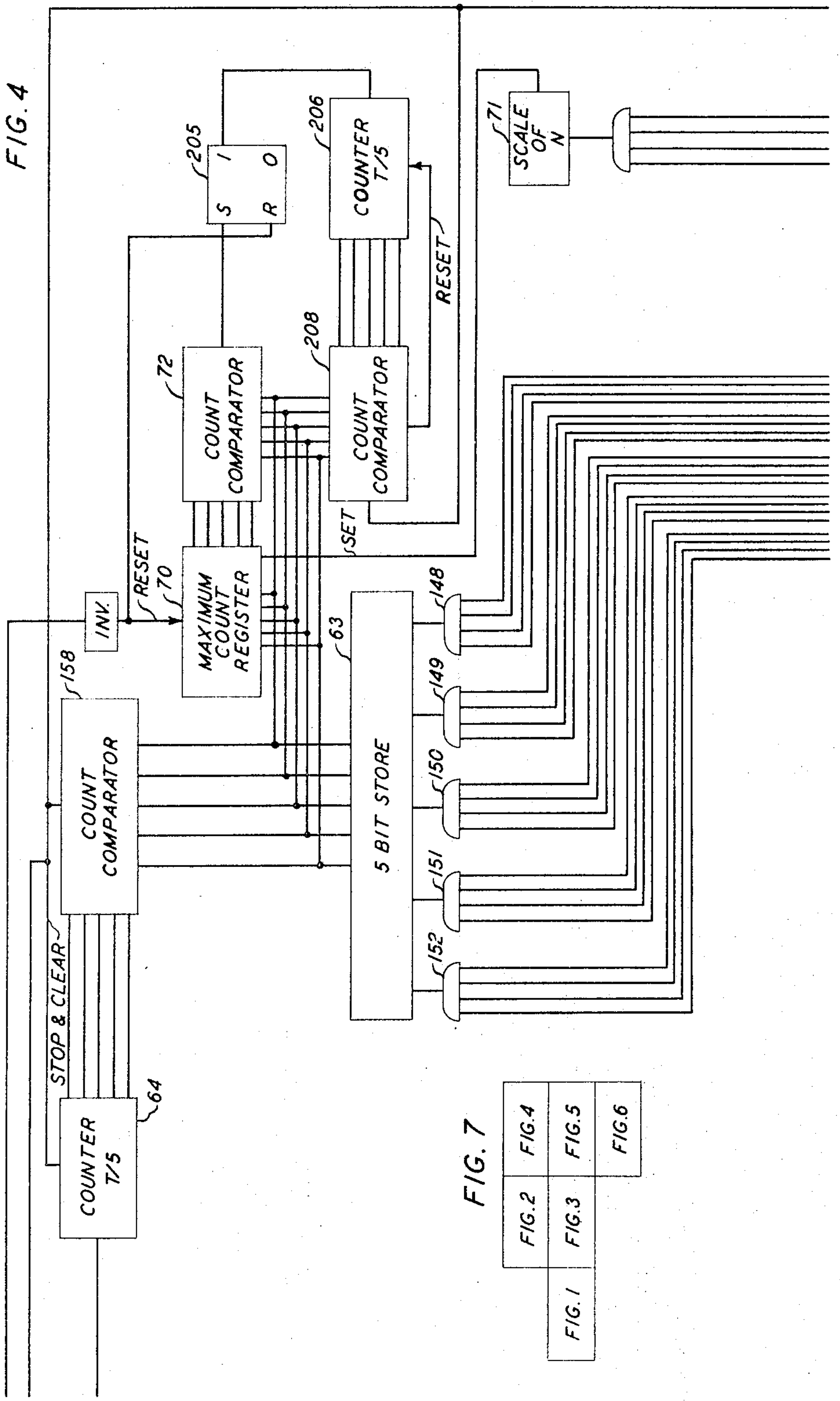
Figure 5:
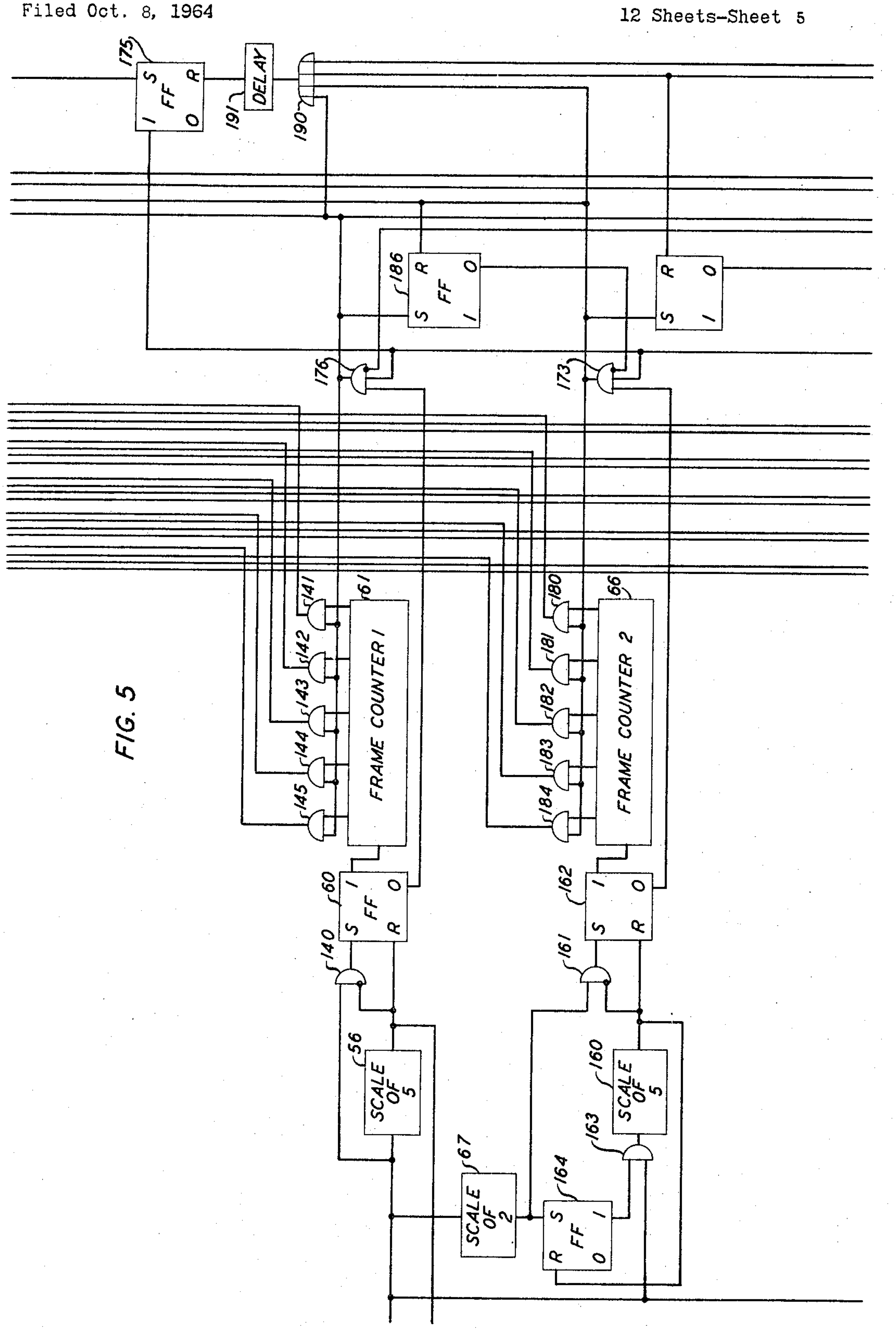
Figure 6:
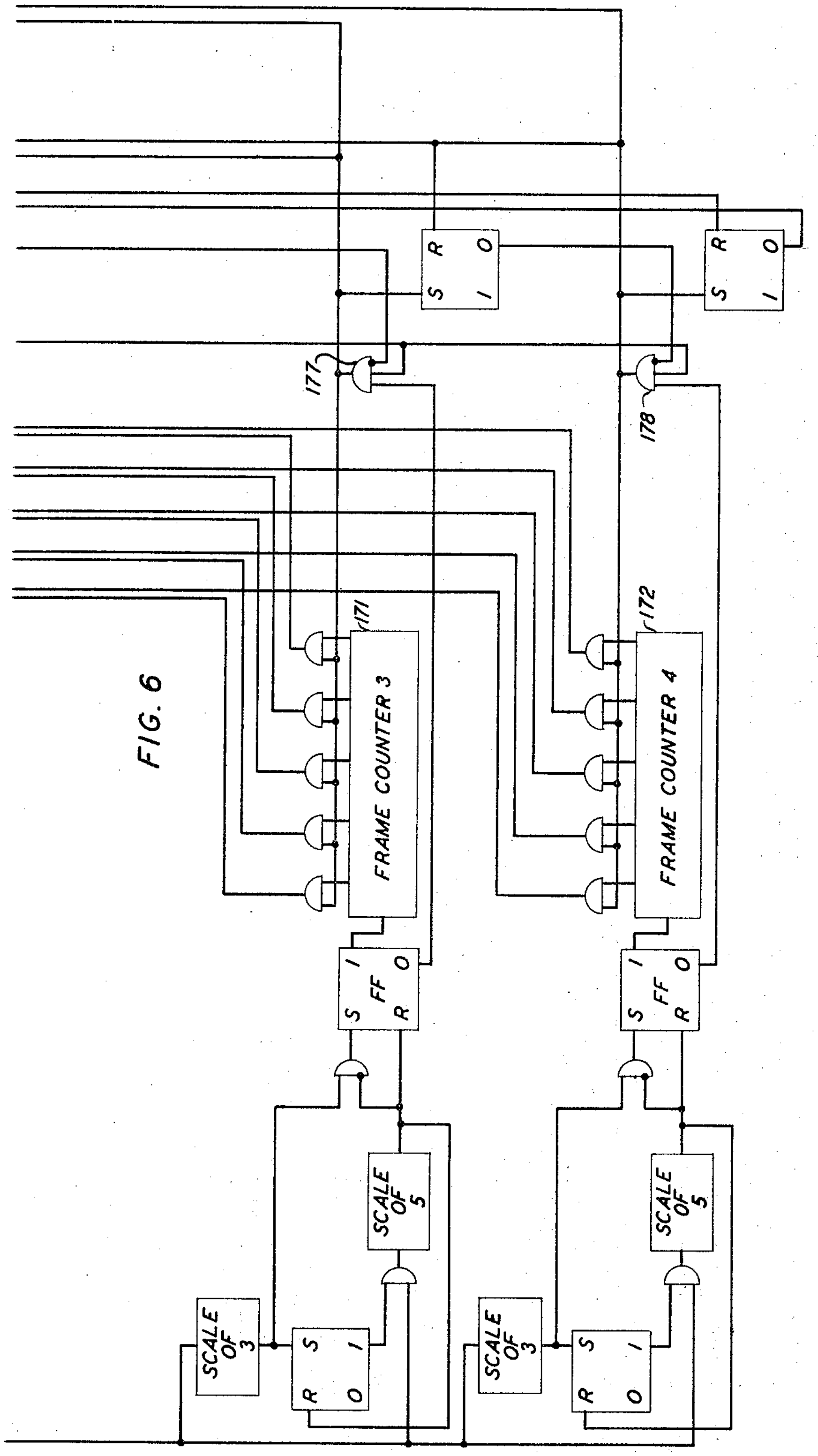
Figures 8A, 8B, 8C:
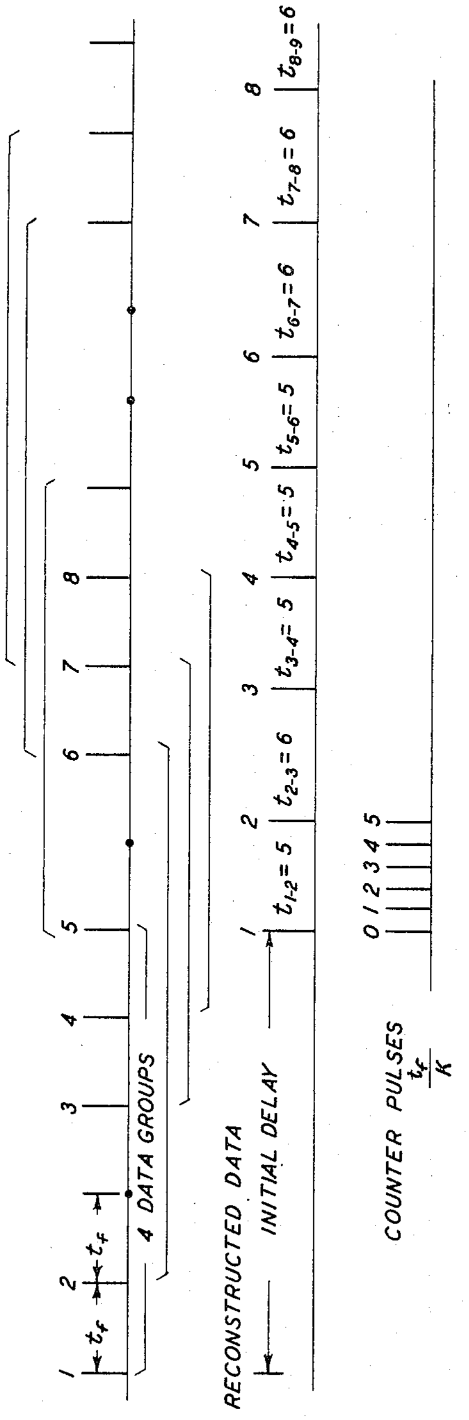
Figure 15:
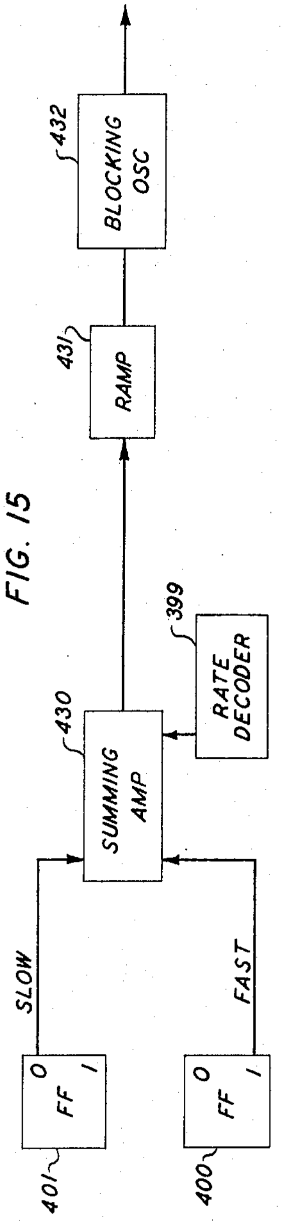
Figure 9:
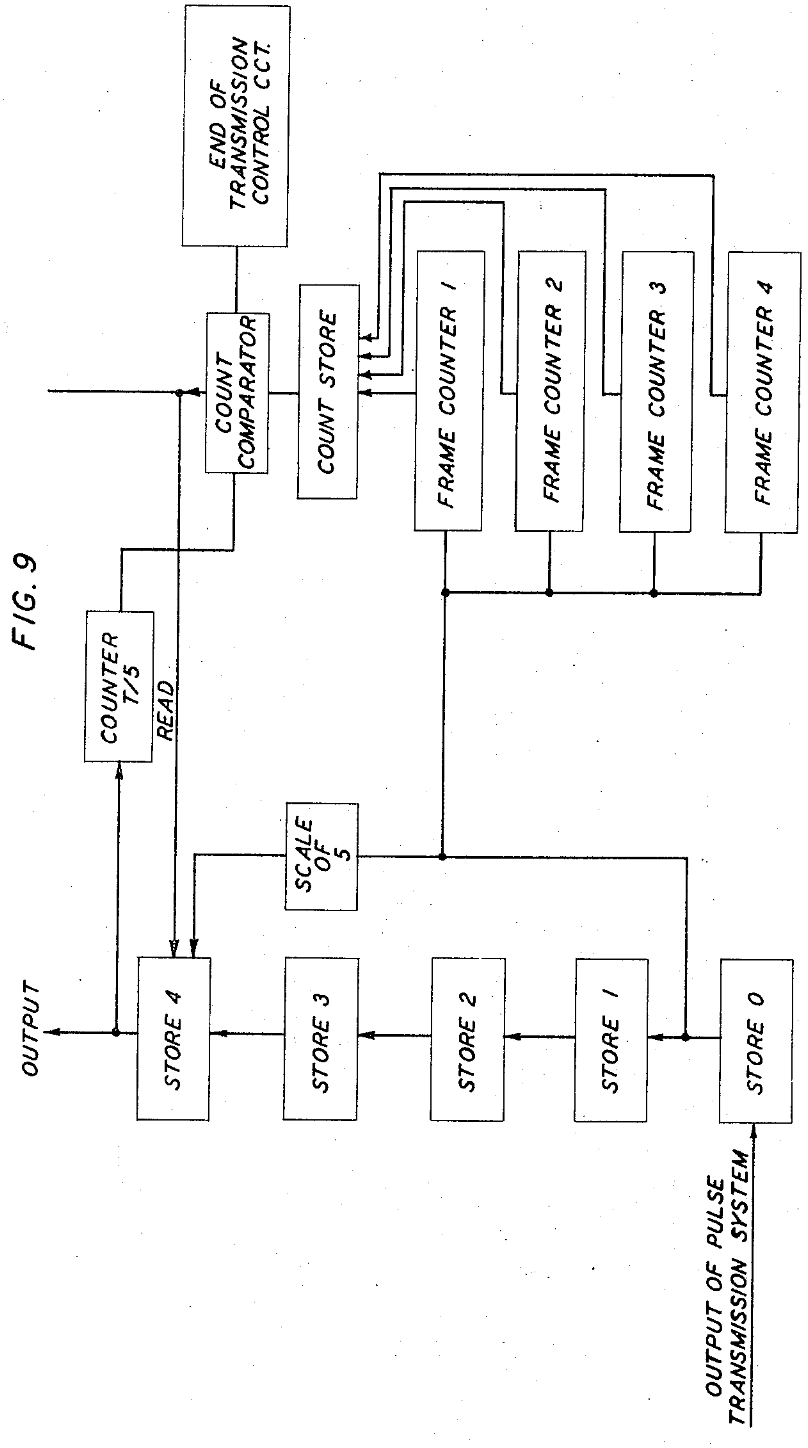
Figures 10, 14:
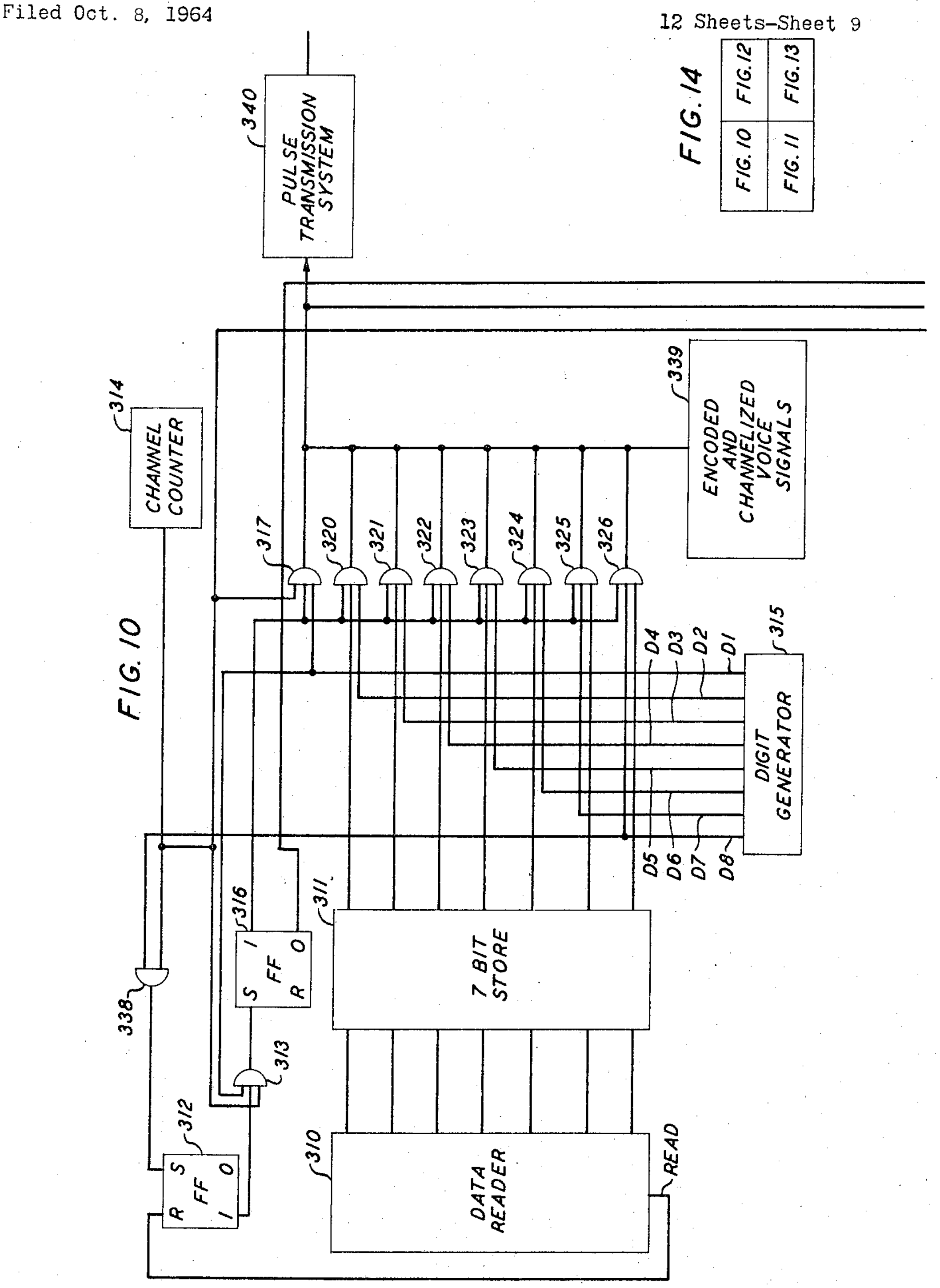

This invention will be more fully comprehended from the following detailed description taken in conjunction with the drawings, in which:

FIGS. 1, 2, 3, 4, 5, and 6 represent a composite block diagram of a data transmission system embodying this invention when these figures are arranged as shown in FIG. 7;

FIGS. 8*a*, 8*b* and 8*c* show a series of symbolic waveforms useful in understanding the operation of the embodiment of the invention shown in FIGS. 1 through 6;

FIG. 9 is a block diagram of the receiving apparatus shown in FIGS. 2, 3, 4, 5, and 6;

FIGS. 10, 11, 12, and 13 represent a composite block diagram of a second data transmission system embodying this invention when these figures are arranged as shown in FIG. 14; and FIG. 15 is a block diagram of the data clock used in the receiving apparatus of the embodiment of the invention shown in FIGS. 10, 11, 12, and 13.

In the transmitting terminal of the embodiment of the invention shown in FIGS. 1 through 6, a data character is read from a data tape and stored until the occurrence of the next data channel, i.e., the channel allocated for the transmission of data, whereupon the data character is read out in the second through eighth time slots of the data channel, with a mark inserted in the first time slot of the data channel to indicate that a data character is to follow. To accomplish such timely read out and signaling, use is made of the digit generator and channel counter found at each terminal of the pulse transmission system described in the above-mentioned articles. The channel counter at the transmitting terminal is used to multiplex seven-bit characters onto the twenty-four channels and for this purpose counts to twenty-four eight thousand times each second, producing twenty-four control pulses which sequentially appear on each of its output terminals for each such count. Each output terminal is associated with a particular channel so that encoded samples to be transmitted in a particular channel are transmitted only upon the occurrence of a pulse at the output terminal of the counter associated with that channel. In conjunction with the channel counter a digit pulse generator is employed to insert the encoded voice signals and any signaling into the eight time slots which make up a channel. For this purpose the digit generator generates eight pulses which sequentially appear on each of eight output terminals D1 through D8 during the eight time slots of each channel in each frame. During the occurrence of the data channel following the storage of a data character, the output of the channel counter and the output pulses from the digit generator combine to insert a mark in the first time slot of the data channel and the stored data character in the second through eighth time slots.

More specifically, with reference to FIG. 1, data are read from a data tape by a data tape read 10 which has seven output terminals at which appear the seven bits of data which make up a data character. These seven parallel bits of data are in turn applied to a seven-bit store 11, and when the data have been so applied the reader 10 generates a read signal which is applied to set a bistable circuit 12. As is frequently done by those skilled in the art, all bistable circuits will be conveniently shown in block diagram form with four terminals S, R, 1 and 0. A signal applied to the "S" terminal is understood to mean that the bistable device will then be "set" producing a reference voltage at the "1" terminal and a ground voltage at the "0" terminal. Conversely, a signal applied to the R terminal produces a reference voltage at the "0" terminal and a ground voltage at the 1 terminal, and the bistable device is then said to be "reset."

The read signal sets bistable circuit 12 whose 1 output terminal is connected to one input terminal of a three input terminal AND gate 13. The other two input terminals of AND gate 13 are connected to the data channel output terminal of the channel counter 14 and the D1 output terminal of the digit generator 15 respectively so that when a data character has already been stored the occurrence of the first time slot of the next occurring data channel produces an output pulse from AND gate 13 whose output terminal is connected to set bistable circuit 16 and produce a reference voltage at its 1 output terminal.

The function of the voltage so generated at the 1 output terminal of bistable circuit 16 is to generate a mark in the first time slot of the data channel to indicate to the receiver that a data character will be transmitted in the data channel of that frame and also to enable circuitry which serially transmits the data character. To accomplish the former purpose the 1 output terminal is connected to one input terminal of a three input terminal AND gate 17, whose other two input terminals are connected to the data channel output terminal of the channel counter 14 and the D1 output terminal of digit generator 15. As a result, during the first time slot of the data channel AND gate 17 generates a reference voltage at its output terminal which is directly applied to the pulse transmission system and a mark is transmitted indicating that a data character is to follow.

The 1 output terminal of bistable circuit 16 is also connected to one input terminal of each of seven transmission gates 20 through 26 to prepare these gates to conduct during the second through eighth time slots. A second input terminal of each transmission gate 20 through 26, respectively, is connected to one output terminal 28 through 34, respectively, of store 11 while the third input terminal of each gate is connected to one of the output terminals D2 through D8, respectively, of digit generator 15. Each transmission gate 20 through 26 is then sequentially actuated during the second through eighth time slots of the data channel so that the data character stored in store 11 is applied to the transmission line during these time slots.

Upon the termination of the data channel, bistable circuits 12 and 16 are reset by the output signal from a two input terminal AND gate 38, one of whose input terminals is connected to the data channel output terminal of counter 14 and the other to the D8 output terminal of generator 15. Transmission gates 17 and 20 through 27 are thus disabled since the voltage at the 1 output terminal of bistable circuit 16 is now at ground potential.

The voice signals are encoded and transmitted over the proper channels by means of the techniques described for such transmission in the above-mentioned articles in the Bell System Technical Journal. This process of encoding and preparing the voice signals for transmission is indicated in block diagram form in FIG. 1 by the circuitry 39 designated by the nomenclature "Encoded and Channelized Voice Signals."

The result of the above-described procedure in transmitting subscriber data is illustrated in FIG. 8. In line *a* of FIG. 8 each data channel in a frame of time $t_t$ is denoted by either a vertical line or a dot. A vertical line indicates that a data character was transmitted in the data channel while a dot indicates that in that data channel no data were transmitted because no data were stored in seven-bit store 11. It is evident from the above description that the procedure by which a subscriber's data were fed into a channel in each frame has resulted in the clustering of data into bunches separated by frames containing no data as shown in line *a* of FIG. 8.

In accordance with this invention, the transmitted data are stored at the receiver, the rate at which data are stored at the receiver is measured, and the data are read out of the receiver at a rate which closely approximates the average rate of reception of the data. Thus, in its simplest terms, the job of the receiving apparatus is to detect a short term average data rate and to read out the data to the subscriber at that rate.

In the embodiment of this invention shown in FIGS. 1, 2, 3, 4, 5, and 6, this is accomplished by counting the number of frames required to supply a predetermined number of channels of data (K), and reading out the first channel of data to the subscriber upon the reception of the $(K+1)$th channel of data. For example, where $K=4$, then, as is shown in FIG. 8, the first transmitted data character is read out to the subscriber as shown in FIG. 8*b* only after the first group of five data channels has arrived. The second data character is read out at such time after the read out of the first data character as to correspond to the number of frames that were transmitted before five data characters were received. To this end a counter, generating timing pulses at K times the frame rate, as shown in FIG. 8*c*, generates pulses corresponding to the number of frames required for the first group of $K+1$ characters to be received. At the end of this count, indicating the number of frames required for the reception of $K+1$ data characters, the second character is read to the subscriber.

The reconstructed data are shown in FIG. 8*b*, and the first data channel is read out to the subscriber only after an initial delay determined by the number of frames which are required for the reception of $K+1$ channels containing data. The second data channel is read out to a subscriber only after the generation of a count which corresponds to the number of frames required for the first $K+1$ data group to be received. At the end of this count, the second data channel is read out to the subscriber. The time between the read out of the first character and the second character is denoted by the period $t_{1-2}$ in FIG. 8*b*, and the time between the read out of each character and its succeeding character is indicated by the same general solution. A continuation of this procedure results in data smoothing as shown in FIG. 8*b* so that the average data rate is in fact recovered by examining the fill of the transmission channels at the receiver without the necessity of sending any rate information over the transmission line.

In somewhat more detail, the data are received at the receiving terminal shown in block diagram form in FIG. 9 and initially stored in store 0. A series of stores are provided; the number of stores, with the exception of store 0, depending upon the number, K, of data channels to be counted as a group. For purposes of the present explanation, four data channels are desired to be counted as a group in order to determine the short term average data rate; and so four stores, stores 1 through 4, respectively, are used to store the four data channels before readout. Store 0, to which the data are initially applied, is provided to store data which might arrive at a rate considerably above the average rate at which data are transmitted.

A data character is initially read into store 0 and then immediately transferred to store 1 and thence to store 2. A second received data character is similarly read into store 0 and then through store 1 to store 2, transferring the first data character into store 3. Similarly, the reception of a third data character causes the first to be read into store 4. Initially, data leave the fourth store only when registers 1 through 4 have been filled, and this initial data character is read out under the control of a scale of 5 counter which generates a first output pulse after the reception of five data characters. After this scale of 5 counter generates an output pulse which reads the first data character out to the subscriber, further read out of the fourth store is inhibited until a series of events to be described below has occurred.

Upon the transmission of a first data character from store 0 to store 1, frame counter 1 commences to count the number of frames required for four additional data channels to be received from the transmission medium. When the four additional data characters have been received, the output signal from the counter, indicating how long it took for those channels to be received, is applied to a count storage circuit whose output is to be compared with the output of a counter counting at a $1/K+1$ rate or five times the frame rate. This counter, shown as counter T/5 in FIG. 9 to indicate that its repetition rate is ⅕ T, i.e., ⅕ the frame rate, commences counting when the first data character is read out to the subscriber, and when its count is equal to the count stored in count storage by frame counter 1, the second data character is read out to the subscriber. Thus, the apparatus has read out the first data character immediately after the fifth data character has been received and has read out the second data character five units of time later, indicating that it required five transmission frames to transmit the second through fifth characters of data.

After the second data character is read out the count of T/5 is reset. A second frame counter is provided which commences counting transmission frames upon the occurrence of the second data character and continues to count until the reception of four additional data characters which, for the example of the input signal shown in FIG. 8*a*, does not occur until the eighth frame of the transmission system or, alternatively, takes six additional frames to occur. The counter T/5 similarly commences to count after the second data channel has been read out to the subscriber and continues to count until a count of six is reached, at which time the number stored in count storage by frame counter 2 corresponds to the count of counter T/5 and the third data character is read out of the fourth store.

Similarly, frame counter 3 does not begin to count until the reception of the third data character and continues to count until four additional data frames have been received. A comparison between the count of frame counter 3 and counter T/5 is again made so that essentially the apparatus is examining the rate at which the data are received and obtaining a short term average of that data and reading data out to the subscriber at that short term average rate.

Special provision must be made for reading out the last data groups stored in the stores after transmission has ceased since the system would otherwise attempt to count the final average rate, which would be infinite when transmission ceased. To read out the last data groups an end of transmission control circuit is provided which counts the maximum count ever generated in the count storage circuit for a predetermined number of incoming frames. All the data stored are read out at that rate when transmission has ceased. That is to say, when the output of any of the frame counters exceeds the number stored in the maximum count register of the end of transmission control circuit, all the data characters remaining stored at the receiver are read out to the subscriber.

More specifically, as shown in FIGS. 2, 3, 4, 5, and 6, data arrive at the receiving terminal and are read into a series of stores 50 through 54, the number of stores depending upon the number of data channels which are counted as a group. Clearly, K stores are needed to store K data channels before read out and an additional store is needed in order to store data which conceivably could arrive at a rate greatly above the subscriber's average data rate. In the receiving apparatus shown in FIGS. 2, 3, 4, 5, and 6, a data receiving terminal is shown in which $K=4$; that is, where it is intended to store four data channels before read out. These four stores are stores 51 through 54. An additional store 50 is provided to store data which might arrive at a rate above the subscriber's data rate. Stores 50 through 54 correspond to stores 0 through 4 in FIG. 9.

A received data character is stored in store 50 and upon storage therein immediately cleared to store 51 and thence to store 52. Except for stores 50 and 51, when a data character enters a particular store, it shifts to the next higher store, if it be empty, only when a new data character is received. Store 50 clears to register 51 immediately, if register 51 is empty.

Initially, a data character is read out to the subscriber from store 54 when stores 51 through 54 have been filled. This occurs under the action of a scale of $K+1$ counter 56, in this example a scale of 5 counter. After the initial read out from store 54, a binary 57 is set which inhibits read out of the register 54 until another series of events have occurred. These events will now be described.

The storage of a mark in the first bistable stage of store 51 sets a bistable circuit 60 which permits frame counter 61, which corresponds to frame counter 1 in FIG. 9, to commence counting at a rate which is equal to the pulse repetition rate of the transmission system. Frame counter 61 is stopped when the scale of 5 counter 56 generates an output pulse, and the count of counter 61 is transferred to a count storage unit 63. At the time register 54 first is filled with data, another counter 64, which corresponds to counter T/5 in FIG. 9, which generates pulses at $K+1$ times the repetition rate of the transmission system, is started. When the count of counter 64 is equal to that stored in store 63, data are shifted out of register 54 to the subscriber. At the same time counter 64 is reset and the count storage unit 63 is automatically cleared.

Figure 11:
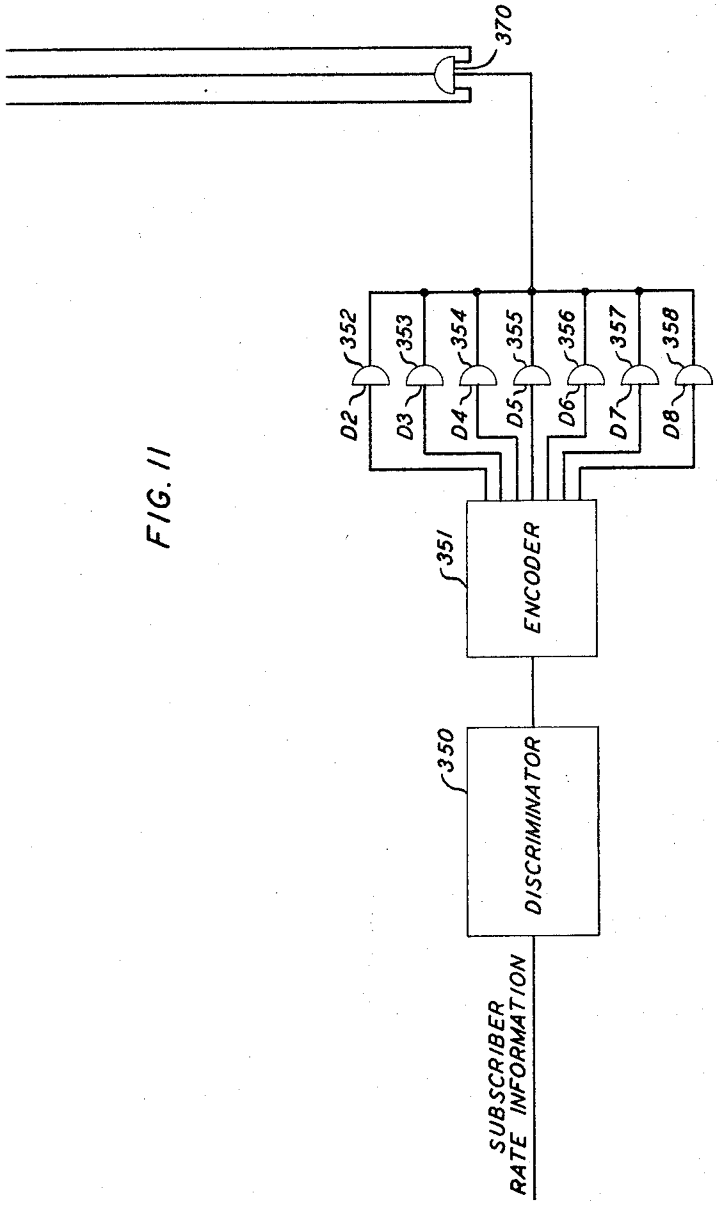

A second frame counter 66, which corresponds to frame counter 2 in FIG. 9, is driven through a scale of 2 counter 67 so that it begins to count one data frame after counter 61 has commenced to count. Counter 66 therefore delivers a count to the count storage unit 63 one frame after counter 61. K, or in this example 4, counters are provided and they cyclically and in turn place data into the count storage unit 63. Since each of these counts stop the counter 64 at the appropriate times, a running average of the incoming data rate is obtained and data are read out to the subscriber as shown in FIG. 11.

Special provision must be made for reading out the last data group to be transmitted because the system as thus far described would attempt to count the final average rate which in the absence of transmitted data would be infinite. To read out the last data group the maximum count ever obtained in the count storage unit 63 for the particular transmission is stored in a maximum count register 70. After a predetermined number, $n$ data groups have been fed into count storage unit 63 of a scale of $n$ counter 71, generating a pulse which stores that maximum count in register 70. Each time the count in five-bit store 63 exceeds that number, count comparison circuit 72 is actuated to outpulse the data. Thus, by setting the scale of $n$ counter 71 to an appropriate number for the transmission involved, the last data group may be read out. Count comparison circuit 72 and all others employed in this embodiment of the invention may be that disclosed in copending application Serial No. 332,152, filed December 20, 1963, by C. G. Davis and L. C. Thomas.

Still more specifically, the receiving apparatus shown in FIGS. 2, 3, 4, 5, and 6 functions in the following manner. A channel counter 80 is present at each receiving terminal of the transmission system and the data channel output terminal of the counter 80 is connected to one input terminal of a two terminal transmission gate 81. The transmitted signal is applied to the second input terminal of transmission gate 81 so that during the reception of data the data character present in the data channel together with the mark transmitted in the first time slot of each channel containing data appears at the output terminal of gate 81. To the output terminal of gate 81 are connected one input terminal of each of a series of two input terminal transmission gates 82 through 89. The second input terminal of each transmission gate 82 through 89 respectively is connected to a respective one of the output terminals D1 through D8 of digit generator 92 forming part of the receiving terminal of the pulse transmission system. Since each transmission gate 82 through 89 is sequentially enabled during the first through eighth time slots of the data slots of the data channel, the data character and the mark in the first time slot are read into seven-bit store 50, connected to receive the outputs of gates 82 through 89.

After storage in seven-bit store 50, the data character is immediately read out of store 50 and into seven-bit store 51. Each of the binary circuits which comprise the seven-bit store 50 has an output terminal the voltage at which represents the state of the particular binary circuit so that the total of these signals represents the data character. Each of the counter output terminals is connected to one input terminal of a respective one of two input terminal transmission gates 100 through 107, the second input terminal of which is connected to the output terminal of an inverter circuit 108. The input terminal to inverter circuit 108 is connected to the output terminal of the first binary counter $B_0$ of seven-bit store 51, which output terminal initially has a space or low reference voltage on it. Inverter circuit 108 serves to convert spaces or low reference voltages to marks or high reference voltages and simultaneously converts marks to spaces. Since a space is initially present at the output terminal of binary counter $B_0$, this low reference voltage is initially converted by inverter circuit 108 to a mark enabling transmission gates 100 through 107 so that the data character initially stored in store 50 is transferred to store 51.

Since the first time slot of each data channel containing a data character contains a mark in the first time slot to indicate that data are present in that channel, a mark is now present at the output terminal of binary counter $B_0$ of seven-bit store 51. This mark or high reference voltage enables transmission gates 110 through 117 so that the data character stored in store 51 is immediately transferred to store 52. In the absence of the reception of additional data characters, no further transfer of the initial data character takes place.

Upon reception of additional data characters, each data character is initially stored in store 50 and then transferred to stores 51 and 52 in succession. The output terminals of store 52 are connected to the input terminals of store 53 by transmission gates which are enabled by a mark stored in binary $B_0$ of store 51. Store 53 is similarly connected to store 54. As a result, the initial data character stored in store 52 is transferred to store 53 and, upon a reception of a second data character following the initial one, is transferred to store 54. This process continues until stores 51, 52, 53, and 54 all contain data. Upon the occurrence of a fifth data character, scale of 5 counter 56 generates an output pulse which is applied to one input terminal of a two input terminal AND gate 120. The second input terminal of AND gate 120 is connected to the 0 output terminal of bistable circuit 57 which is initially in the reset condition. Thus, upon the occurrence of the fifth input data character, gate 120 is enabled. The output terminal of gate 120 is connected to one input terminal of each of a series of transmission gates 122 through 128. A second input terminal of each of the transmission gates 122 through 128 is connected to the output terminal of binary $B_0$ of store 54 so that upon the occurrence of the fifth data character, transmission gates 122 through 128 are enabled and read out to the subscriber the data character stored in the binaries $B_1$ through $B_7$ of store 54.

Thus, data initially leave register 54 when registers 51 through 54 have been filled. At this time scale of 5 counter 56 has generated a first output pulse, and after the generation of this pulse binary 57 is set by the output signal from counter 56 delayed by delay circuit 139 for approximately two time slots. Now a low reference voltage is applied from the 0 output terminal of bistable circuit 57 to AND gate 120 to disable AND gate 120 and prevent further read out from store 54. As a result, no additional data characters are read out of store 54 until the sequence of events to be described below have occurred.

The mark in the first time slot of the data channel occupied by the first data character which appeared at the output terminal of binary counter $B_0$ of store 51 is applied to an inhibit gate 140 whose output sets bistable circuit 60 whose 1 output terminal is in turn connected to the input terminal of frame counter 61. As a result, frame counter 61 commences to count at a rate equal to the frame rate of the pulse transmission system, and frame counter 61 continues to count until scale of 5 counter 56 generates an output pulse at the end of the fifth frame containing data, which output pulse resets bistable circuit 60 and stops frame counter 61 and inhibits gate 140. Each of the bistable circuits comprising frame counter 61 has its output terminal connected to one input terminal of a respective one of five transmission gates 141 through 145, which are enabled after the reception of the fifth frame containing data by the reference voltage present at the 0 output terminal of bistable circuit 60. The output terminals of transmission gates 141 through 145 are each connected to a respective one of five OR gates 148 through 152 so that the number of frames during which it took to receive five data channels is transferred to five-bit store 63.

As discussed above, the second data character is to be read out of store 54 when the count of counter 64 equals the count stored in five-bit store 63. Counter 64 is initially turned on when a data character is first read out of store 54. At this time transmission gate 155 is enabled by the output of transmission gate 120 and the mark present at the output terminal of bistable circuit $B_0$ of store 54. Counter 64 then commences counting at $K+1$ times the frame rate, or in this example five times the frame rate, and when the number counted by counter 64 is equal to the number stored in five-bit store 63, count comparator 158 generates an output pulse which enables transmission gates 122 through 128 so that the second data character is read out of store 54.

In addition, the output of the count comparator stops counter 64 and restores it to zero.

The third data character is read out of store 54 at the proper time under the control of apparatus comprising frame counter 66, which corresponds to frame counter 2 in FIG. 9, scale of 5 counter 160, and scale of 2 counter 67, and their associated apparatus. The frame counter 66 is turned on upon the reading into store 51 of a second data frame since at that time scale of 2 counter 67 produces an output signal which is transmitted through inhibit gate 161 to set bistable circuit 162. The 1 output terminal of bistable circuit 162 is in turn connected to the frame counter, and frame counter 2 commences counting in response to the reference voltage at the 1 output terminal. This count continues until scale of 5 counter 160 produces an output pulse indicating that five additional data frames have been received. Toward this end, transmission gate 163 has its output terminal connnected to the input terminal of counter 160 and one of its input terminals directly connected to the $B_0$ output terminal of store 51. The second input terminal of gate 163 is connected to the 1 output terminal of bistable circuit 164 which is set by the output of scale of 2 counter 67. Upon the occurrence of the fifth data frame after counting has begun, the scale of 5 counter 160 generates an output pulse which resets bistable circuits 162 and 164. At this time data should be read out of frame counter 66 into the count storage unit and, barring the presence of data from frame counter 1 in store 63, this is accomplished by a signal from the 0 output terminal of bistable circuit 162.

In situations where data occur in spurts, it is possible for the count from a first frame counter, such as frame counter 61, to be stored in the five-bit store 63 at the time that frame counter 2 is to be read out. To prevent the destruction of the count from counter 61, prior to the count from counter 64 reading data out to the subscriber, the frame counters 61, 66, 171, and 172 are inhibited from reading their counts into count storage until the count from the preceding frame counter has been compared with the count from counter 64. In addition, the outputs of frame counters 61, 66, 171, and 172 are "queued up" so that the counters read out in the proper order. More specifically, the count in frame counter 66 cannot be read out into five-bit store 63 until count comparator 158 has read out data to the subscriber, and toward this end the shift signal from the 0 output terminal of bistable circuit 162 is applied to an inhibit gate 173 which is inhibited from transmitting the shift signal until the preceding counter, i.e., frame counter 61, has been read out, and in addition a count comparison has been made by comparator 158 and data read to the subscriber.

To control the proper read out of the frame counters, the read out of each individual frame counter is inhibited whenever the preceding frame counter has not been read out or its count not compared with the count from counter 64. For example, frame counter 66 cannot be read out whenever an inhibit signal is applied to the inhibit terminal of inhibit gate 173, indicating that the preceding frame counter 61 has not been read into store 63. The output terminal of inhibit gate 173 is connected to one input terminal of each of five transmission gates 180 through 184. Inhibit gate 173 normally produces an output pulse when bistable circuit 162 is reset, provided that bistable circuit 175 is also in its set condition, indicating that a count comparison has just been made. When the count of counter 66 has previously been read into store 63, the signal appearing at the output terminal of inhibit gate 176 sets bistable circuit 186 so that its 0 output terminal is at group potential and inhibit gate 173 is enabled. As a result, frame counter 66 will be the next frame counter whose count is read out into five-bit store 63 since all the other inhibit gates are disabled because the bistable circuits to which their inhibit terminals are connected are in the reset condition. When frame counter 66 is read out the output pulse from inhibit gate 173 is used to reset bistable circuit 186 so that inhibit gate 173 is disabled until frame counter 61 is again read out.

The output terminals of each of the inhibit gates 176, 173, 177, and 178 are each connected through an OR gate 190 and a delay circuit 191 to the reset terminal of bistable circuit 175 so that bistable circuit 175 is reset each time data are read into store 63 and is only placed in the set condition when a count comparison has been made and data read out to the subscriber. In this manner, the frame counters can only be read into store 63 when the information previously stored therein has been compared with the count of counter 64. In addition, the frame counters must be read out in order since they are inhibited from doing otherwise.

Since the receiving apparatus is constantly deriving the short term average data rate and reading the data characters out to the subscriber at that short term rate, cessation of transmission would normally result in the apparatus attempting to derive a short term data rate which could be infinite. As a result, the data character stored in the stores at the cessation of the transmission would never be read out, and apparatus is provided to read out the data characters remaining in the stores when no further data are transmitted. This apparatus, to be described below, reads the remaining data to the subscriber at the slowest data rate transmitted to the subscriber over the course of a predetermined interval of time.

The output terminal of each of the inhibit gates 176, 173, 177, and 178 are each applied through an OR gate 200 to a scale of $n$ counter 71, which produces an output pulse after a predetermined number of data frames have been read out to the subscriber. The maximum count achieved by any frame counter during this time is then recorded in maximum count register 70, and henceforth whenever the count of five-bit store 63 exceeds that maximum count a signal is generated by count comparator circuit 72. This indicates that no data have been received by the receiving terminal for a period of time which exceeds the maximum time in which no data were received during the first $n$ frames. This signal is used to then read out the remaining data in the stores at the slowest rate at which data were transmitted during the first $n$ transmission frames. To accomplish this end, the output of the count comparator circuit 72 sets a bistable circuit 205 to activate a counter 206 which counts at five times the frame rate. Counter 206 commences counting at 0 and counts until it reaches the count stored in maximum count register 70, whereupon count comparator circuit 208 generates an output pulse which reads that data out of store 54 and advances remaining data in the stores to the next succeeding store. The output of comparator 208 also resets counter 206 so that it again counts to the maximum count and reads out still another data character to the subscriber. This process continues until all the data have been read out to the subscriber at the slowest data rate, whereupon the output terminal of the $B_0$ bistable circuit of store 54 is at ground potential, which serves to reset the maximum count register 70 and bistable circuit 205.

Thus, in accordance with this invention the rate at which data arrive at the receiver is constantly examined, the short term average data rate determined, and data characters read out to the subscribers in accordance with that short term rate. The result is a smoothing of the flow of data to the subscriber which enables the subscriber to employ data handling equipment whose peak capability is substantially less than the peak rate of data transmission. The voice signals transmitted in all the channels except the data channel are demultiplexed and decoded in accordance with the techniques described in the above-mentioned articles in the January 1962 issue of the Bell System Technical Journal.

Where the average rate of transmission of data is known, the above-described system may be considerably simplified by reconstructing the average data rate using a servo clock and an initial amount of information denoting the average data rate. By monitoring the fill of the storage registers at the receiving terminal, the initial information about the average data rate may be monitored. In addition, such a system has the advantage that delay between the reception of data at the receiving terminal and read out of the first data character to the subscriber may be substantially reduced by having the data clock already running at a rate close to the long term average data rate.

A transmission system embodying this invention and employing a data clock which is initially set to the expected long term average data rate is shown in FIGS. 10, 11, 12 and 13 which are arranged as shown in FIG. 14. The data clock, shown in block diagram form in FIG. 15, governs the read out rate at the receiving terminal, and this data clock is preset to the subscriber's long term average data rate. By examining the fill of two seven-bit stores at the receiving terminal, the short term average data rate is determined and the read out rate is modified in accordance with such determinations.

A first of these stores at the receiving terminal accepts data directly from the pulse transmission system and then immediately transfers this information to a second store from which it is read out to the subscriber at a rate determined by the initial rate to which the data clock is set and the short term average data rate. In accordance with this invention, this is done in the following manner. When the store directly connected to the pulse transmission system is full and in addition the succeeding store is also full, a signal is applied to the data clock to speed that clock up. If, however, when the first store fills, the second store is empty, then no signal is applied to the data clock to either increase or decrease its frequency since the absence of a data character in the second store means that its data character has been read out under the action of the data clock, and the speed of the data clock is therefore correct. When both stores are empty a slowdown command is applied to the data clock which decreases its frequency. Thus, the fill of two stores is examined to determine whether the long term average data rate should be modified in order to take care of short term variations.

The transmitting terminal of this simplified apparatus is shown in FIG. 10. This transmitting terminal is very similar to that shown in FIG. 1, with all the apparatus for transmitting data characters identical to that shown in FIG. 1. To indicate that the apparatus for transmitting data characters is identical to that shown in FIG. 1, corresponding apparatus has been given reference numerals 300 numbers higher in FIG. 10. In addition, provision is made for transmitting predetermined information regarding the long term average data rate. A sine wave signal whose frequency is equal to that of a long term data rate is applied to a discriminator circuit 350, with the output of the discriminator circuit encoded by a seven-digt encoder 351. Whenever a data character is not being transmitted in a data channel, encoded subscriber rate information is transmitted, and toward this end each of seven output terminals of the encoder are connected to one input terminal of one of a series of transmission gates 352 through 358. Transmission gates 352 through 358 are sequentially actuated by the $D_2$ through $D_8$ terminals of digit generator 315, and their output terminals are all connected to one input terminal of a transmission gate 370. Since gate 370 is enabled during the presence of a data channel in which no data are sent, as indicated by a reference voltage at the 0 output terminal of bistable circuit 316, the long term data rate is encoded and transmitted in the data channel whenever data are not being transmitted in a data channel. At the receiving terminal this information is used to preset the data clock.

Figure 12:
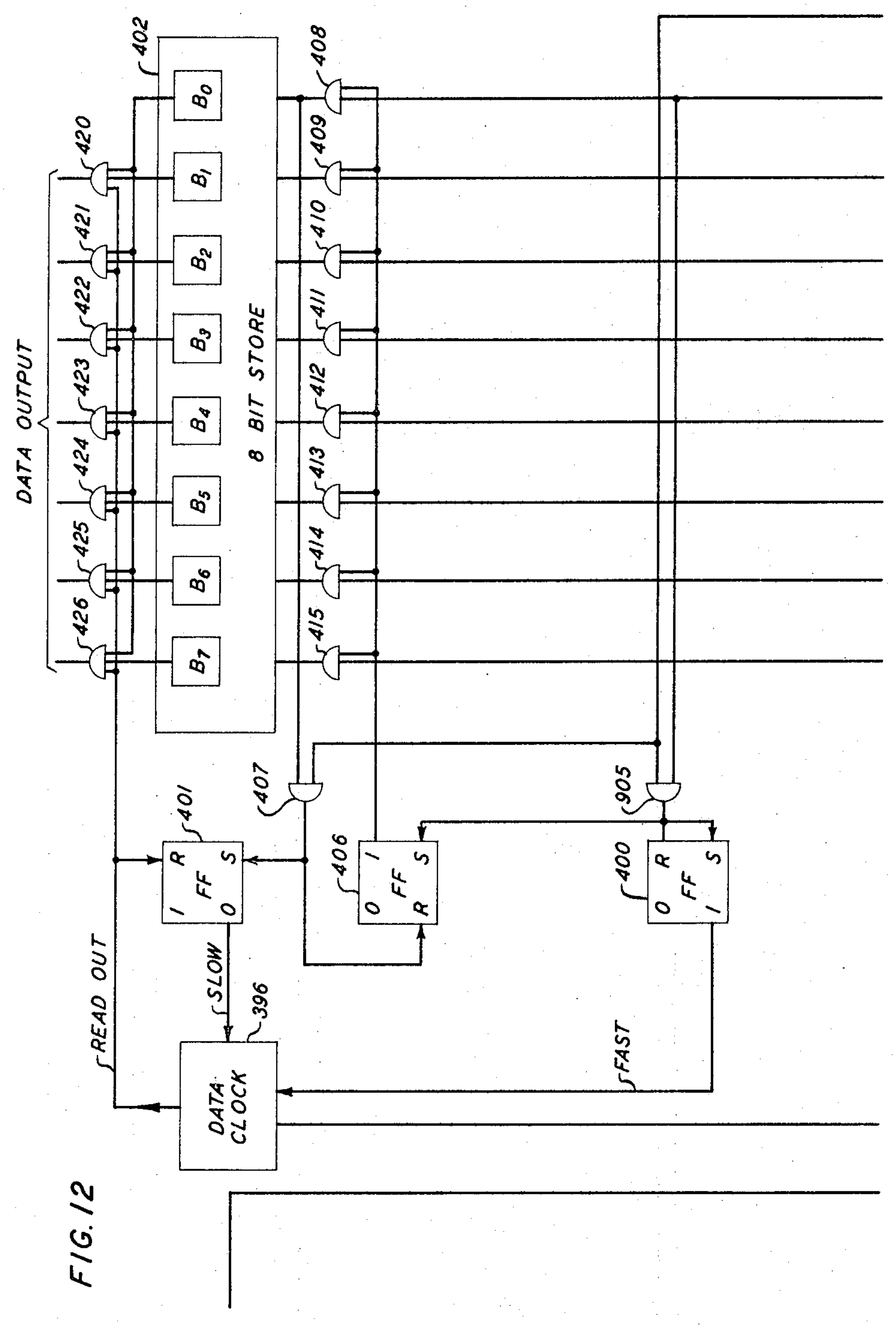
Figure 13:
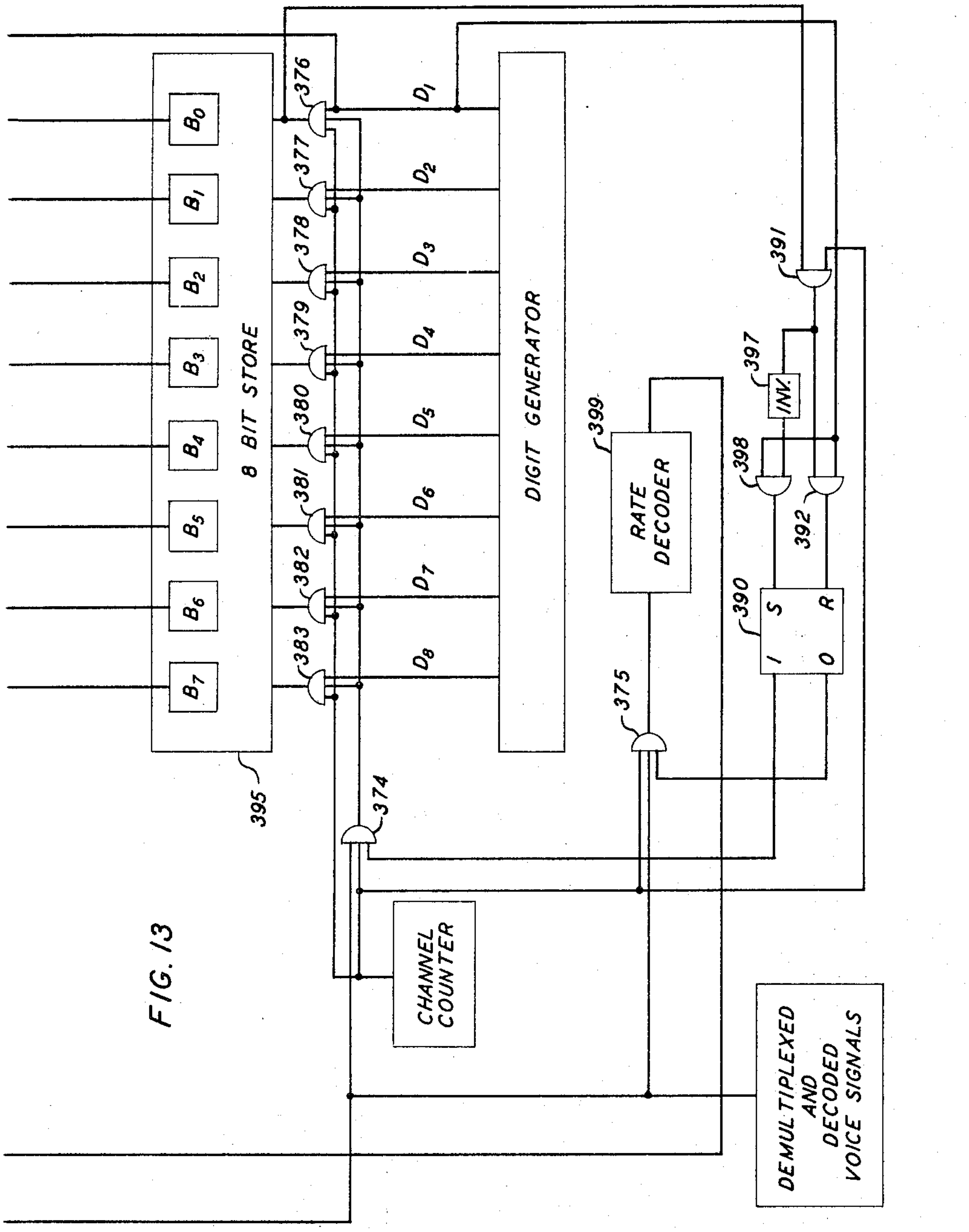

The output of the pulse transmission system is applied to the receiving terminal shown in FIGS. 12 and 13. The received signal is applied to a first transmission gate 374 and a second transmission gate 375, the first of which is enabled whenever a data character is being transmitted and the second enabled when data rate information is being transmitted. To accomplish the former function transmission gate 374 has a second input terminal connected to the output of the channel counter and a third input terminal connected to the 0 output terminal of a bistable circuit 390 which is reset upon the occurrence of a pulse in the first time slot of a data channel, indicating that data are being sent. The resetting signal for bistable circuit 390 is derived from a circuit comprising AND gates 391 and 392. AND gate 391 is enabled upon the occurrence of the first time slot of each data channel which contains a mark, and this in turn actuates AND gate 392 whose output signal resets bistable circuit 390. The pulse appearing at the 0 output terminal of bistable circuit 390 then actuates transmission gate 374 which in turn enables transmission gates 376 through 383 so that the first pulse indicating the transmission of data and the data character are read into eight-bit store 395 during the eight time slots of the data channel.

The data clock 396 is initially set at a rate which is equal to the intended average rate of transmission. The encoded signal which has been transmitted to the receiver indicative of this average rate is transmitted in the second through eighth time slots of a data channel while the first time slot contains no signal, or a space which indicates that data are not being transmitted and that data rate information is being transmitted. Upon the occurrence of a space in the first time slot of a data channel, AND gate 391 has no signal output, or a space, at its output terminal. An inverter circuit 397 connected to the output terminal of AND gate 391 then produces a mark which is applied to a first input terminal of a transmission gate 398. As a result transmission gate 398 is actuated during the first time slot of each data channel which does not contain data. The output signal from transmission gate 398 is used to set bistable circuit 390 which in turn enables transmission gate 375 and rate decoder 399 so that the data rate information may be decoded and applied to the data clock to initially set it at the average data rate. More specifically, the 1 output terminal of bistable circuit 390 is connected to a third input terminal of transmission gate 375, which, as a result, is actuated during the first time slot of each data channel which contains data rate information. This information is then decoded by a rate decoder 399 and applied to the data clock to initially set it at the average data rate.

The reception of the first data character and its storage in eight-bit store 395 does not vary the speed of the data clock 396. Specifically, when the first eight-bit store 395 is filled, a speed-up signal is generated by a bistable circuit 400, and this speed-up signal is applied to the data clock 396. A second bistable circuit 401, however, is initially in its reset condition, and it generates a signal at its 0 output terminal which is applied to the data clock to slow down the data clock. The speed-up signal and the slow-down signal from bistable circuits 400 and 401 then cancel each other so that there is no increase in speed. Only when eight-bit store 395 and eight-bit store 402 are both filled with data is a speed-up signal applied to the data clock 396 to speed up the rate at which data are read out of store 402. Similarly, when store 402 has data stored therein and no data are stored in store 395, a slow-down signal is applied to the data clock.

The speed-up signal is generated in the following manner. A transmission gate 405 is enabled during the first time slot of each data channel in which a data character has been transmitted, and the reference voltage output signal from the transmission gate 405 is used to set bistable circuit 400. The 1 output terminal of the bistable circuit 400 is then at a reference potential output, which potential is applied to the data clock, whose structure and operation will be described below, to cause the clock to speed up in the absence of a slow-down signal from bistable circuit 401. In addition, the output from transmission gate 405 sets bistable circuit 406, whose 1 output terminal is connected to one input terminal of each of a series of transmission gates 408 through 415. A second input terminal of each of these transmission gates is connected to a respective one of the output terminals of the $B_0$ through $B_7$ binary stages of eight-bit store 395 so that data stored in that eight-bit store is immediately transferred to store 402.

If eight-bit store 402 had been full at the same time as eight-bit store 395 filled, bistable circuit 401 would be in its set condition due to the setting of that bistable circuit during the first time slot of the data channel in which data had been stored in store 402 by the output signal from AND gate 407. As a result, a ground potential would appear at the 0 output terminal of bistable circuit 401 so that no signal is applied to the data clock to slow it down, and the speed of the data clock will be increased in order to read the data out of the eight-bit store 402. Each time that the data clock generates a read out pulse, transmission gates 420 through 426 are actuated, and these gates are connected to the binary stages $B_1$ through $B_7$ of eight-bit store 402 and are enabled by the mark present at the $B_0$ stage. The read out signal in addition resets bistable circuit 401 so that for each read out of data a slow signal will be generated at the 0 output terminal of bistable circuit 401.

If no data are stored in store 395 when data have been read out of store 402, transmission gate 405 is disabled and the resulting ground signal resets bistable circuit 400, producing a ground signal at its 1 output terminal. As a result, the fast signal is not applied to the data clock, and the data clock is slowed down.

The data clock 396 is shown in block diagram form in FIG. 13, together with the rate decoder 399 and bistable circuits 400 and 401 which generate the speed-up and slow-down signals respectively. The 0 output terminal of bistable circuit 401, the 1 output terminal of bistable circuit 400, and the output of the decoder 399 are each connected to a summing amplifier 430 which produces an output signal which is the sum of the input voltages applied thereto. The output of the rate decoder 399 is an analog voltage representative of the average data rate as initially transmitted from the transmitting terminal. Thus, three signals are applied to summing amplifier 430; a fast signal and a slow signal, which when present are each predetermined reference voltages, and an analog voltage from decoder 399. As a result, the output of summing amplifier 430 is the sum of these voltages, and it is used to set the initial output voltage of a ramp generator 431 which generates a voltage which varies linearly with time, which voltage upon reaching a predetermined output level triggers a blocking oscillator 432 whose output is the output of the data clock. Whenever a data character is read out a ground potential is generated at the 0 output terminal of bistable circuit 401. This reduction in input voltage to summing amplifier 430 reduces its output amplitude which in turn sets ramp generator 431 to a lower initial value so that it takes longer for the ramp generator to reach an output voltage level at which the blocking oscillator 432 will trigger. As a result, data are read out at a slow rate. Similarly, when bistable circuit 401 is set, a reference voltage is generated at its 1 output terminal, which increases the sum of the input voltages to the summing amplifier, increases the initial amplitude to which the ramp generator is set, and increases the repetition rate of the blocking oscillator 432. When the slow-down and speed-up signals occur at the same time, they negate each other, and the blocking oscillator continues to generate output pulses and to read out data, at the data rate transmitted by the subscriber as determined by decoder 399 which provides the third input signal to the summing amplifier.

Thus, in accordance with this invention, data from one or more data sources may be multiplexed on a regenerative transmission system with voice signals, transmitted in predetermined channels, and the data supplied to a subscriber at the receiving terminal at a rate which is substantially less than the peak rate of data transmission. By examining the "fill" of stores at the receiving terminal, short term average data rates are constantly determined, and the data read out accordingly. As a result of the elimination of peak rates of data transmission, the subscriber can employ less expensive equipment.

It is to be understood that the above-described arrangements are illustrative of the application of the principles of the invention. Numerous other arrangements may be devised by those skilled in the art without departing from the spirit and scope of the invention.

What is claimed is:

1. Apparatus for transmitting data from a data source over a predetermined channel of a multiple channel regenerative pulse code modulation transmission system comprising, in combination, a source of data characters, means at the transmitting terminal of said transmission system to store each of said data characters, means at said transmitting terminal to transmit each of said stored data characters in said predetermined channel, means at the receiving terminal to store the received data, and means at said receiving terminal to measure the rate at which data is stored at the receiving terminal and read the data out of said stores at a rate equal to the average rate at which data is stored at the receiving terminal.

2. Apparatus for transmitting data from a data source over a predetermined channel of a multiple channel regenerative pulse code modulation transmission system comprising, in combination, a source of data characters, means at the transmitting terminal of said transmission system to store each of said data characters, means at said transmitting terminal to transmit each of said stored data characters in said predetermined channel, a plurality of stores at said receiving terminal, means at the receiving terminal to store each received data character in a first of said stores, means to transfer the storage of a first received data character from said first store to successive stores upon the reception of subsequent data characters, means to measure the rate at which said stores at the receiving terminal are filled and to determine the short term average rate of data transmission therefrom, and means to read the data out of a last of said plurality of said stores at the receiving terminal at said determined short term average rate of transmission.

3. Apparatus for transmitting data over a predetermined channel of a multiple channel regenerative pulse code modulation transmission system comprising, in combination, a source of data characters, means at the transmitting terminal of said transmission system to store each of said data characters, means at said transmitting terminal to transmit each of said stored data characters in said predetermined channel, a plurality of $K+1$ stores at the receiving terminal, means at said receiving terminal to initially store a received data character in a first of said stores, means at said receiving terminal to transfer a stored data character to a successive store in response to the reception of successive data characters, means to read a first received data character out of the $(K+1)$th store when $K+1$ data characters have been received, means to determine the time required for K data characters to be received after the reception of the first data character, means to read a second received data character out of said $(K+1)$th store when a period of time has elapsed proportional to the time determined for K data characters to arrive after the first data character, and means to read successive data characters out of said $(K+1)$th store each in accordance with a time proportional to that required for K additional characters to be received after the read out of a preceding transmitted character from said $(K+1)$th store.

4. Apparatus for transmitting data over a predetermined channel of a multiple channel regenerative pulse code modulation transmission system comprising, in combination, a source of data characters, means at the transmitting terminal of said transmission system to store each of said data characters, means at said transmitting terminal to transmit each of said stored data characters in said predetermined channel, means to transmit encoded data rate information in said predetermined channel in the absence of the transmission of a data character, two stores at the receiving terminal, means at the receiving terminal to initially store a received data character in a first of said stores and then transfer its storage to the second store, decoding means at said receiving terminal to decode said information transmitted in said predetermined channel in the absence of data, a data clock at said receiving terminal whose frequency is initially determined so as to read data out of said second store at a rate determined by the output of said decoding means, means at said receiving terminal to increase the speed of said data clock when said first and said second stores at the receiving terminal are filled, and means to reduce the speed of said data clock when both stores are empty.

5. Apparatus for transmitting data over a predetermined channel of a multiple channel regenerative pulse code modulation transmission system having a frame comprising $f$ time slots comprising, in combination, a source of data characters, storage means at the transmitting terminal of said transmission system to store said data characters, means at said transmitting terminal to transmit each of said stored data characters in said predetermined channel, a plurality of $K+1$ stores at said receiving terminal, a plurality of transmission gates at said receiving terminal which are enabled during the reception of a data character and store a received data character in a first of said stores at said receiving terminal, gating means to transfer each stored data character to a successive store in said receiving terminal in response to the reception of successive data characters, a scale of $K+1$ counter at said receiving frame connected to count said received data characters and produce an output signal after $K+1$ data characters have been received, means connecting the output of said scale of $K+1$ counter to the $(K+1)$th store to read out a first received data character after $K+1$ data characters have been received, a first frame counter at said receiving terminal which is activated upon the reception of a first data character and counts at the frame rate of the transmission system and continues to count until K data characters have been received after the reception of the first data character to determine the time required for said K additional data characters after the first to be received, a counter at said receiving terminal which counts at a rate $K+1$ times the frame rate of said transmission system which is enabled upon the read out of a first data character and continues to count until its count corresponds to the count of the first frame counter, count comparison means to compare the count of said first frame counter and said counter which counts at a rate $K+1$ times that of the frame rate of said transmission system to produce an output signal at a time proportional to the time determined for K data characters to arrive after the first and read a second received data character out of said $(K+1)$th store, and means to read successive data characters out of said $(K+1)$th store each in accordance with a time proportional to that required for K additional data characters to be received after the read out of a preceding transmitted character from said $(K+1)$th store.

6. Apparatus for transmitting data over a predetermined channel of a multiple channel regenerative pulse code modulation transmission system comprising, in combination, a source of data characters, means at the transmitting terminal of said transmission system to store each of said data characters, means at said transmitting terminal to transmit each of said stored data characters in said predetermined channel, encoding means at said transmitting terminal to transmit encoded data rate information in said predetermined channel in the absence of the transmission of a data character, two stores at the receiving terminal, gating means at the receiving terminal to initially store a received data character in a first of said stores and then transfer its storage to the second store, decoding means at said receiving terminal to decode said information transmitted in said predetermined channel in the absence of data, a data clock at said receiving terminal whose frequency is initially determined so as to read data out of said second store at a rate determined by the output of said decoding means, a first bistable circuit which is placed in the set condition whenever a data character is stored in a first of said stores at said receiving terminal a second bistable circuit which is placed in the set condition whenever a data character is stored in said second store, and means responsive to the outputs of said first and second bistable circuits to increase the speed of said data clock when said first and second stores at the receiving terminal are filled, and to reduce the speed of said data clock when both stores at the receiving terminal are empty.

No references cited.

ROBERT C. BAILEY, *Primary Examiner.*

R. M. RICKERT, *Assistant Examiner.*